Figure 3:

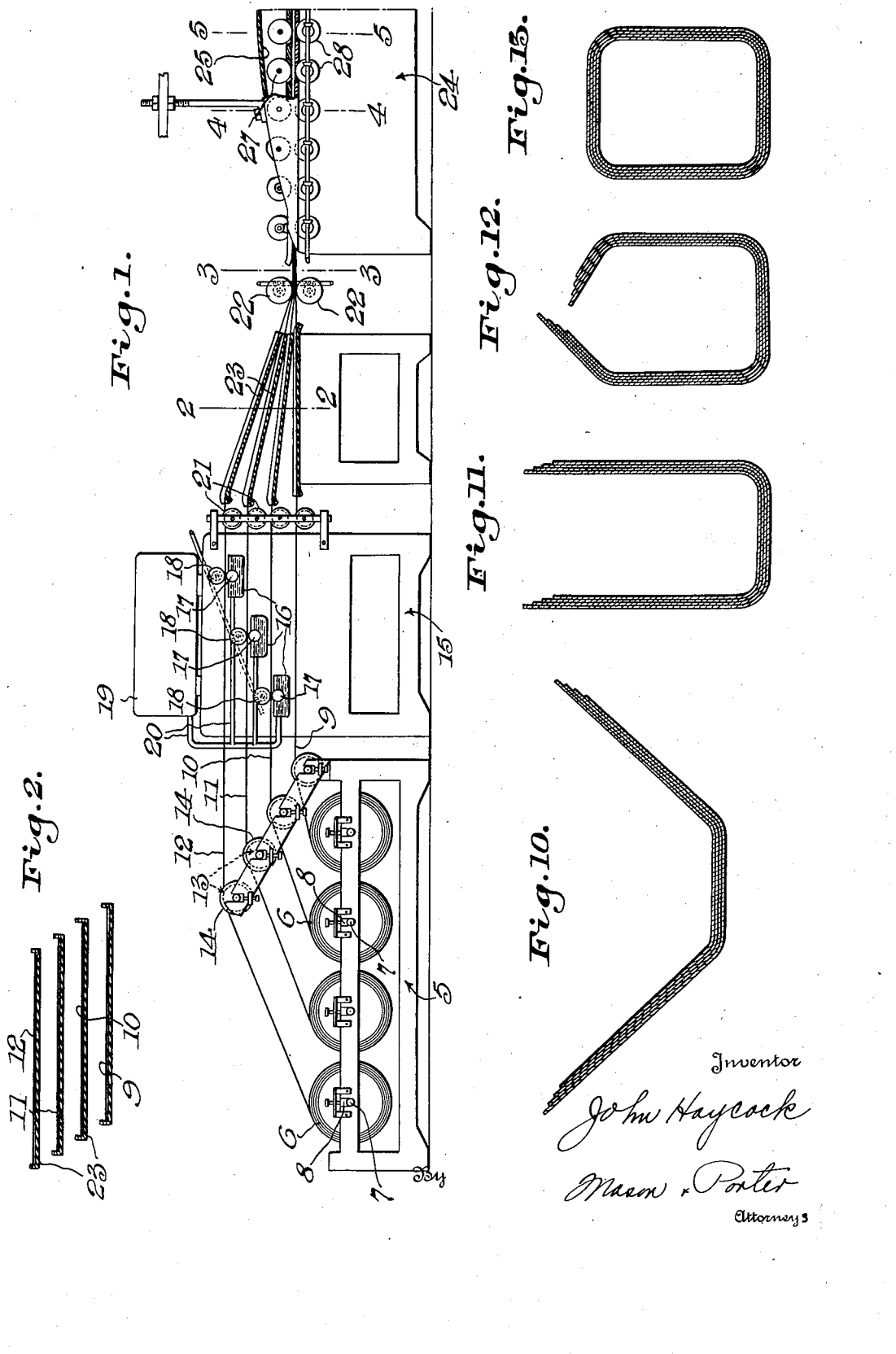

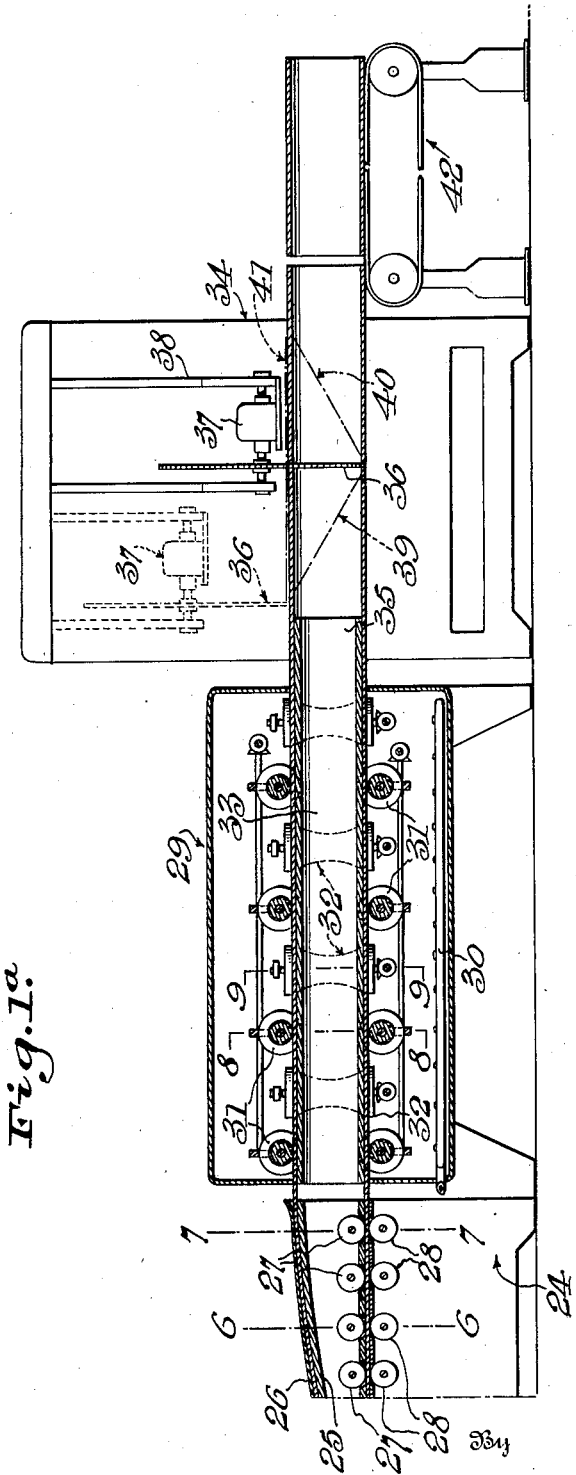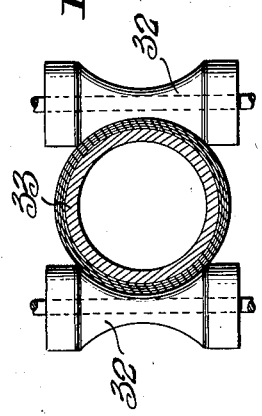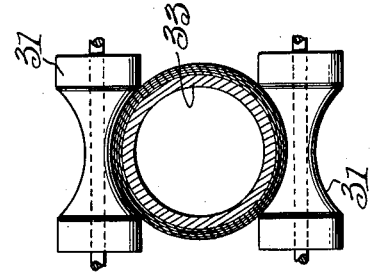

Sept. 16, 1941. J. HAYCOCK 2,256,263
METHOD OF AND APPARATUS FOR FORMING PAPER CONTAINER BODIES
Filed Oct. 10, 1940 3 Sheets-Sheet 3

Inventor
John Haycock
Mason & Porter
Attorneys

Patented Sept. 16, 1941

2,256,263

UNITED STATES PATENT OFFICE 2,256,263

METHOD OF AND APPARATUS FOR FORMING PAPER CONTAINER BODIES

John Haycock, Larchmont, N. Y., assignor to Continental Can Company, Inc., New York, N. Y., a corporation of New York Application October 10, 1940, Serial No. 360,653

15 Claims. (Cl. 93—82)

The invention relates generally to the formation of containers in which to package products for the market, and it primarily seeks to provide a novel method of and apparatus for forming container bodies of paper.

Container bodies have been formed of paper heretofore but some difficulties have been encountered in forming such container bodies inexpensively, and in providing the necessary strength therein and the uniformity of wall thickness from end to end so necessary in the provision of perfect seals at the end closures. It is a purpose of the present invention to remove these difficulties.

In its more detailed nature, the invention has for an object to provide a novel method of forming paper container bodies which consists of continuously feeding a plurality of webs of paper in superposed relation and with the edges thereof laterally and progressively staggered, applying liquid adhesive to the surfaces of the webs intended to mutually adhere, pressing the webs together to form a continuous multi-ply web having oppositely staggered or ply feathered edges while continuously feeding said multi-ply web, progressively shaping the travelling multi-ply web in tubular form while the adhesive between plies is wet and bringing the oppositely staggered edges into abutting relation to form a continuous tube of uniform thickness throughout its length and circumference, applying heat to the tube while feeding it longitudinally and holding the tubular form thereof to cause the adhesive to set and retain said tubular form, and thereafter severing the continuous tube into container body lengths.

Another object of the invention is to provide a novel container body forming method of the character stated which includes the step of cutting the continuously formed tube into container body lengths while it is travelling and just after the adhesive has become set by application of heat.

Another object of the invention is to provide a novel apparatus for making paper container bodies and comprising a support for a plurality of paper web rolls, means for guiding a multiple of paper webs from the rolls in superposed spaced relation and with their lateral edges oppositely and progressively staggered, means for applying an adhesive to the surfaces of the webs intended to mutually adhere, means for bringing the superposed webs together and pressing them in mutual contact to form a continuous multi-ply web having oppositely and progressively staggered edges, a horn for progressively shaping the multi-ply web into tubular form while the adhesive is wet between the plies and bringing the oppositely staggered edges into abutting relation to form a continuous tube of uniform thickness throughout its length and circumference, means for feeding the multi-ply web along said horn, an adhesive setting tube heating oven, a tubular shape holding horn in said oven, means for pressing the tube against the shape holding horn while passing through said oven, and means for severing the continuous tube into container body lengths.

Another object of the invention is to provide a novel apparatus of the character stated in which the means for pressing the tube against the shape holding horn comprises tube feeding rollers shaped to apply pressure to all surfaces of the tube throughout the circumference thereof.

Another object of the invention is to provide a novel apparatus of the character stated in which the means for feeding the superposed webs along the tube shaping horn comprises a set of idler rolls mounted within the horn and having edge contact with said webs, and a set of opposing power driven rolls disposed without said horn.

With the above and other objects in view that will hereinafter appear, the nature of the invention will be more clearly understood by following the detailed description, the appended claims, and the several views illustrated in the accompanying drawings.

In the drawings:

Figures 1 and 1A together comprise a somewhat diagrammatic side elevation and part longitudinal sectional view illustrating the invention.

Figure 4:
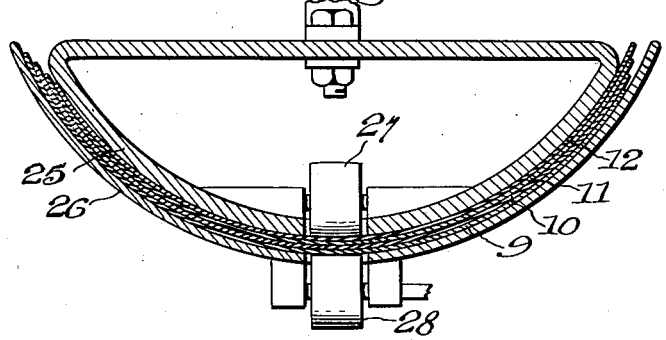
Figure 5:
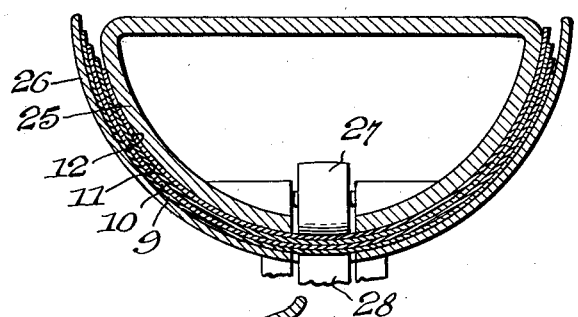
Figure 6:
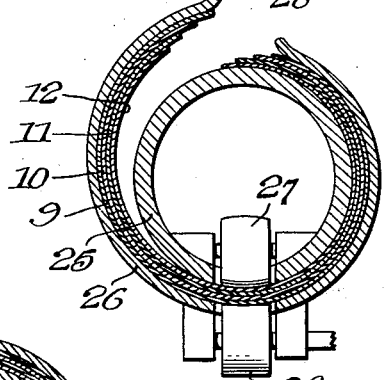
Figure 7:
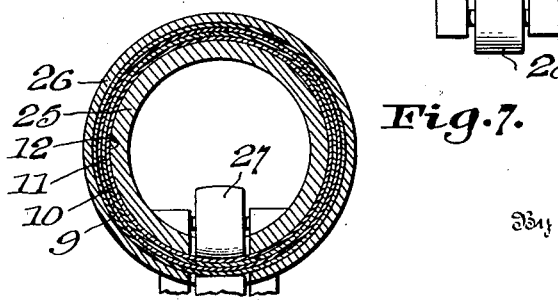

Figures 2, 3, 4, 5, 6, 7, 8 and 9 are detail vertical cross sections taken respectively on the lines 2—2, 3—3, 4—4, 5—5, 6—6, 7—7, 8—8 and 9—9 on the composite Figure 1, 1A.

Figure 10, 11, 12 and 13 are detail cross sections illustrating progressive stages in the shaping of a continuous tube which is other than cylindrical in form.

In the example of embodiment of the invention herein disclosed there is included a rack 5 upon which are supported a plurality of paper web rolls 6. The rolls 6 are supported on trunnions 7 in drag or friction bearings 8. Four such rolls are illustrated, and the four webs fed from these rolls are designated 9, 10, 11 and 12 respectively, 9 being the outer or uppermost of the webs and 12 the inner or lowermost of these webs. Each web passes over an idler roll 13 supported on the rack 5, and each idler roll includes lateral guide flanges 14 which engage the edges of the guided webs. The guide flanges of the rolls 13 are disposed in laterally staggered relation so as to oppositely and progressively stagger the superposed webs 9, 10, 11 and 12 in the manner clearly illustrated in Figures 2 and 3 of the drawings.

After leaving the idler guide rolls 13 the individual webs 9, 10, 11 and 12 pass horizontally, and in vertically spaced relation, through a gluing or adhesive applying machine generally designated 15. An individual glue pot 16 is disposed between each vertically spaced pair of webs, or specifically, beneath each of the webs 10, 11 and 12 in the manner best illustrated in Figure 1 of the drawings. In each glue pot 13 is included an applicator roll 17 which is immersed in the adhesive contained in the pot and which engages the under surface of the respective paper web in a manner for applying adhesive over the whole of the lower surface of the travelling web. Each applicator roll 17 is opposed by a power driven draw roll 18 for feeding the webs through the adhesive applying machine. The adhesive is delivered to the individual glue pot 16 from a supply tank 19 through individual feed lines 20.

As they pass out of the adhesive applying machine 15, the individual webs pass over flanged guide rolls 21, and from these guide rolls they pass to and between upper and lower presser rolls 22. In passing to the rolls 22, the individual webs pass through flanged guide troughs 23 which cooperate with the guide rolls 21 in maintaining the oppositely and progressively staggered relation of the web edges. Between the opposed rolls 22, the individual webs 9, 10, 11 and 12 are brought together in a composite or multi-ply web with the individual plies thereof adhering in superposed relation and with the lateral edges thereof oppositely and progressively staggered in the manner clearly illustrated in Figure 3 of the drawings. It is to be understood that as the multi-ply web passes through the rolls 22 the adhesive between the individual plies of the web is still wet and the plies are free to move relatively.

As the multi-ply web leaves the presser rolls 22 it passes into a continuous tube forming machine generally designated 24. This machine includes an inner forming horn 25 and an outer forming horn or surrounding shell 26 which is continuous circumferentially only at the delivery end of the machine. The inner forming horn is supported by a depending bracket member 25a which is attached to an overhanging portion of the frame in any suitable way. In Figures 1 and 1A of the drawings there is illustrated an apparatus for forming tubular can body stock which is cylindrical in shape, and in Figures 4, 5, 6 and 7 the gradual, progressive changes in shape of the inner and outer horn 25, 26 effective in gradually and continuously forming the tube stock into the intended cylindrical form is clearly illustrated. While passing continuously through the forming machine 24, the continuous multi-ply web is gradually changed in shape from a flat multi-ply web to a continuous cylindrical tube, the edge portions of the previously flat web which previously were staggered progressively in opposite directions being brought together in abutting relation at the top of the tube and in a manner for providing a tube uniform in thickness throughout its length and about its circumference.

The tube shaping inner and outer horn equipment 25, 26 is provided with a plurality of idler rollers 27 along the bottom thereof, said rollers being mounted within the inner horn, and these idler rollers are opposed by power driven feed rollers 28 disposed without said horn equipment. The roller equipments 27 and 28 engage the web along a median line and serve to feed the multi-ply web along while it is being shaped into a cylindrical tube and to deliver the uniform thickness, cylindrical tube into a drying oven generally designated 29 and wherein is included a suitable heat source 30.

Within the drying oven 29 the formed continuous, cylindrical tube passes between upper and lower sets of rollers 31 and lateral sets of rollers 32. The rollers 31 and 32 are power driven and are shaped to engage all of the external surface of the cylindrical tube in feeding relation and in pressure contact in opposition to a form retaining and guiding horn 33 over which the tube passes within the oven. It is to be understood that while the continuous tube is passing through the oven, the heat serves to set the adhesive while shape retaining pressure is being applied to the tube, and when the tube emerges from the oven the adhesive between the plies of the wall stock is finally set and the desired permanent uniform thickness throughout the length and circumference of the tube has been attained. The relation of the pressure shaping and feeding rollers 31 and 32 and the horn 33 is best illustrated in Figures 1A, 8 and 9 of the drawings.

After the continuous tube leaves the drying oven 29, it passes into a cutting machine generally designated 34 and in which the continuous tube is cut into short lengths for use, preferably into container body lengths. The guiding horn 33 may be extended from the drying oven a distance into the cutting machine as indicated at 35. While any approved form of cut-off mechanism may be employed for severing the continuous tube into short lengths, the cut-off mechanism herein diagrammatically illustrated comprises a circular saw 36 driven by a motor 37 mounted on a carriage 38 which traverses the continuous tube while being moved longitudinally at the same speed at which the continuous tube moves. Thus the cutting edge of the saw, while effecting a body length cut-off, is lowered along a line designated 39 to form a body severing transverse cut, and then is raised during idle rotation along a line indicated at 40. After the saw emerges from the line of severance of the tube length, the movable carriage rapidly returns the saw along the line 41 into position for repeating the travel feed traverse as previously described.

The severed lengths of container body tube stock are received on a suitable take-off conveyor generally designated 42. This conveyor 42 is driven by any suitable means (not shown) and is preferably operated at a slightly faster speed so as to separate the conveyors from each other as indicated in Figure 1A.

While the principal illustration of the invention is devoted to the formation of a cylindrical multi-ply wall tube, it is to be understood that the invention may readily be applied in the formation of multi-wall tubes of uniform wall thickness throughout their length and circumference which are other than cylindrical in shape. For example, in Figures 10, 11, 12 and 13, are diagrammatically illustrated progressive steps in the shaping of a multi-wall continuous tube which is generally rectangular in cross section.

In practicing the improved method, the plurality of paper webs are continuously fed from the supply rolls in superposed relation with the edges thereof laterally and progressively staggered. The adhesive is applied to the surfaces of the webs intended to mutually adhere, and the individual webs are pressed together to form a continuous multi-ply web having its opposite edges progressively staggered or ply feathered in the manner illustrated in Figure 3. The multi-ply web is progressively shaped into tubular form while it is being fed along, and while the adhesive between the plies is still wet, thus enabling such relative movement of the plies as may be necessary in permitting the shaping without danger of wrinkling of any of the plies. By reason of the opposite and progressive staggering of the edges of the individual plies, these edges come together at the top of the tube in abutting relation and thereby provide uniformity in wall thickness throughout the length and circumference of the continuous tube.

In passing through the drying oven the shape and uniformity of wall thickness of the tube is retained, and since the adhesive is definitely set by the heat in the oven, this shape and wall thickness uniformity will be permanently retained. Because of the uniformity of wall thickness throughout the length and circumference of the continuous tube and the container body lengths severed therefrom, end closures can be applied to the can bodies without danger of any leakage caused by lack of uniformity of wall thickness at the container ends.

In order to have each separate layer or wall ply of the tube meet or abut properly in the formed tube it is necessary to have the individual plies varied in width, the innermost layer being the narrowest, the next slightly wider and so on to the outermost layer which has the greatest width. An example for calculating these dimensions is given below, assuming an intent to make tubing for containers having an inside diameter of 3.000 inches and 4 ply walls of paper each ply .008" in thickness.

The width of each such ply would be as follows:

Inner or 1st ply 3.000"+½ thickness of paper=3.004"×3.1416=9.437"=width.

Inner or 2nd ply 3.004"+.016 thickness of paper=3.020"×3.1416=9.488"=width.

Inner or 3rd ply 3.020"+.016 thickness of paper=3.036"×3.1416=9.538"=width.

Outer or 4th ply 3.036"+.016 thickness of paper=3.052"×3.1416=9.588"=width.

It should be understood also that materials other than paper can be included for one or more of the tube wall plies. For instance, one of the layers may be made of aluminum or tin foil.

It has been previously stated that the continuously formed tube length preferably is cut into container body lengths. However, the invention comprehends the cutting of the tube into longer lengths, if desired, and subsequent cutting of said longer lengths into shorter or container lengths.

It is of course to be understood that the details of structure and arrangement of parts may be variously changed and modified without departing from the spirit and scope of my invention as defined in the appended claims.

I claim:

1. The method of forming paper container bodies which consists of continuously feeding a plurality of webs of paper in superposed relation and with the edges thereof laterally and progressively staggered, applying liquid adhesive to the surfaces of the webs intended to mutually adhere, pressing the webs together to form a continuous multi-ply web having oppositely staggered edges while continuously feeding said multi-ply web, progressively shaping the travelling multi-ply web into tubular form while the adhesive between the plies is wet and bringing the oppositely staggered edges into abutting relation to form a continuous tube of uniform thickness throughout its length and circumference, means for holding said webs pressed tightly together and applying heat causing the adhesive to set.

2. The method of forming paper container bodies which consists of continuously feeding a plurality of webs of paper in superposed relation and with the edges thereof laterally and progressively staggered, applying liquid adhesive to the surfaces of the webs intended to mutually adhere, pressing the webs together to form a continuous multi-ply web having oppositely staggered edges while continuously feeding said multi-ply web, progressively shaping the travelling multi-ply web into tubular form while the adhesive between the plies is wet and bringing the oppositely staggered edges into abutting relation to form a continuous tube of uniform thickness throughout its length and circumference, maintaining pressure on the tube in the region of the staggered abutted edges while feeding said tube longitudinally through a heated oven for causing the adhesive to set.

3. The method of forming paper container bodies which consists of continuously feeding a plurality of webs of paper in superposed relation and with the edges thereof laterally and progressively staggered, applying liquid adhesive to the surfaces of the webs intended to mutually adhere, pressing the webs together to form a continuous multi-ply web having oppositely staggered edges while continuously feeding said multi-ply web, progressively shaping the travelling multi-ply web into tubular form while the adhesive between the plies is wet and bringing the oppositely staggered edges into abutting relation to form a continuous tube of uniform thickness throughout its length and circumference, maintaining pressure on the tube throughout the entire circumferential region thereof while feeding said tube longitudinally through a heated oven for causing the adhesive to set.

4. Apparatus for forming paper container bodies comprising, a web roll support, paper web rolls on said support, means for guiding a multiple of paper webs from said rolls in superposed spaced relation and with their lateral edges oppositely and progressively staggered, means for applying an adhesive to the surfaces of said webs intended to mutually adhere, means for bringing the superposed webs together and pressing them in mutual contact to form a continuous multi-ply web having oppositely and progressively staggered edges, a horn for progressively shaping the multi-ply web into tubular form while the adhesive is wet between the plies and bringing the oppositely staggered edges into abutting relation to form a continuous tube of uniform thickness throughout its length and circumference, means for feeding the multi-ply web along said shaping horn, an adhesive setting oven, and means for severing the continuous tube into short lengths for use in containers.

5. Apparatus for forming paper container bodies comprising, a web roll support, paper web rolls on said support, means for guiding a multiple of paper webs from said rolls in superposed spaced relation and with their lateral edges oppositely and progressively staggered, means for applying an adhesive to the surfaces of said webs intended to mutually adhere, means including opposed draw rollers for bringing the superposed webs together and pressing them in mutual contact to form a continuous multi-ply web having oppositely and progressively staggered edges, a horn for progressively shaping the multi-ply web into tubular form while the adhesive is wet between the plies and bringing the oppositely staggered edges into abutting relation to form a continuous tube of uniform thickness throughout its length and circumference, means for feeding the multi-ply web along said shaping horn, an adhesive setting oven, and means for severing the continuous tube into short lengths for use in containers.

6. Apparatus for forming paper container bodies comprising, a web roll support, paper web rolls on said support, means for guiding a multiple of paper webs from said rolls in superposed spaced relation and with their lateral edges oppositely and progressively staggered, means for applying an adhesive to the surfaces of said webs intended to mutually adhere, means for bringing the superposed webs together and pressing them in mutual contact to form a continuous multi-ply web having oppositely and progressively staggered edges, a horn for progressively shaping the multi-ply web into tubular form while the adhesive is wet between the plies and bringing the oppositely staggered edges into abutting relation to form a continuous tube of uniform thickness throughout its length and circumference, means for feeding the multi-ply web along said shaping horn, an adhesive setting oven, means in the oven for holding the tubular shape of the continuous tube while the adhesive between the plies is being set, and means for severing the continuous tube into short lengths for use in containers.

7. Apparatus for forming paper container bodies comprising, a web roll support, paper web rolls on said support, means for guiding a multiple of paper webs from said rolls in superposed spaced relation and with their lateral edges oppositely and progressively staggered, means for applying an adhesive to the surfaces of said webs intended to mutually adhere, means for bringing the superposed webs together and pressing them in mutual contact to form a continuous multi-ply web having oppositely and progressively staggered edges, a horn for progressively shaping the multi-ply web into tubular form while the adhesive is wet between the plies and bringing the oppositely staggered edges into abutting relation to form a continuous tube of uniform thickness throughout its length and circumference, means for feeding the multi-ply web along said shaping horn, an adhesive setting oven, an internal horn and opposing shape pressing rollers within the oven for holding the tubular shape of the continuous tube while the adhesive between the plies is being set, and means for severing the continuous tube into short lengths for use in containers.

8. Apparatus for forming paper container bodies comprising, a web roll support, paper web rolls on said support, means for guiding a multiple of paper webs from said rolls in superposed spaced relation and with their lateral edges oppositely and progressively staggered, means for applying an adhesive to the surfaces of said webs intended to mutually adhere, means for bringing the superposed webs together and pressing them in mutual contact to form a continuous multi-ply web having oppositely and progressively staggered edges, an inside outside horn equipment for progressively shaping the multi-ply web into tubular form while the adhesive is wet between the plies and bringing the oppositely staggered edges into abutting relation to form a continuous tube of uniform thickness throughout its length and circumference, means for feeding the multi-ply web along said shaping horn, an adhesive setting oven, and means for severing the continuous tube into short lengths for use in containers.

9. Apparatus for forming paper container bodies comprising, a web roll support, paper web rolls on said support, means for guiding a multiple of paper webs from said rolls in superposed spaced relation and with their lateral edges oppositely and progressively staggered, means for applying an adhesive to the surfaces of said webs intended to mutually adhere, means for bringing the superposed webs together and pressing them in mutual contact to form a continuous multi-ply web having oppositely and progressively staggered edges, a horn for progressively shaping the multi-ply web into tubular form while the adhesive is wet between the plies and bringing the oppositely staggered edges into abutting relation to form a continuous tube of uniform thickness throughout its length and circumference, idler rollers mounted within the shaping horn and opposing power driven rollers without the shaping horn for feeding the multi-ply web along said shaping horn, an adhesive setting oven, and means for severing the continuous tube into short lengths for use in containers.

10. Apparatus for forming paper container bodies comprising, a web roll support, paper web rolls on said support, means for guiding a multiple of paper webs from said rolls in superposed relation with their lateral edges oppositely and progressively staggered and with portions of the superposed web portions horizontally disposed and vertically spaced, means for applying an adhesive to the whole of the under surface of each web except the lowermost one thereof, means for bringing the superposed webs together and pressing them in mutual contact to form a continuous multi-ply web having oppositely and progressively staggered edges, a horn for progressively shaping the multi-ply web into tubular form while the adhesive is wet between the plies and bringing the oppositely staggered edges into abutting relation to form a continuous tube of uniform thickness throughout its length and circumference, means for feeding the multi-ply web along said shaping horn, an adhesive setting oven, and means for severing the continuous tube into short lengths for use in containers.

11. In a method of forming paper container bodies, the steps of forming a multi-ply web having the lateral edges of the plies thereof oppositely and progressively staggered, longitudinally feeding the web by roller contact along a median line of the web, and gradually changing the shape of the travelling web from flat to tubular with the opposite ply edges abutting so as to form a tube uniform in wall thickness throughout its length and circumference.

12. In a method of forming paper container bodies, the steps of forming a flat multi-ply web having wet adhesive between the opposing surfaces of the plies and the lateral edges of the plies thereof oppositely and progressively staggered, longitudinally feeding the web by roller contact along a median line of the web, gradually changing the shape of the travelling web from flat to tubular with the opposite ply edges abutting so as to form a tube uniform in wall thickness throughout its length and circumference, and then setting the adhesive to retain the shape of the tube.

13. In a method of forming paper container bodies, the steps of forming a multi-ply web having wet adhesive between the opposing surfaces of the plies and the lateral edges of the plies thereof oppositely and progressively staggered, longitudinally feeding the web by roller contact along a median line of the web, gradually changing the shape of the travelling web from flat to tubular with the opposite ply edges abutting so as to form a tube uniform in wall thickness throughout its length and circumference, and immediately applying heat and pressure to set the adhesive and fix the shape of the tube.

14. In apparatus of the character described, means for forming a multi-ply web having wet adhesive between the opposing surfaces of the plies and the lateral edges of the plies thereof oppositely and progressively staggered, means for shaping the web into a continuous tube comprising an inner shaping horn having a shaping surface for receiving the web flatwise and gradually changing it to tubular form, means for gradually turning the edges of the web about the horn to cause them to meet in abutting relation to form a continuous tube uniform in wall thickness throughout its length and circumference, and roller means engageable with the web along a median line and effective to feed the web and the gradually and progressively formed tube along the horn.

15. In apparatus of the character described, means for forming a multi-ply web having wet adhesive between the opposing surfaces of the plies and the lateral edges of the plies thereof oppositely and progressively staggered, means for shaping the web into a continuous tube comprising an inner shaping horn having a shaping surface for receiving the web flatwise and gradually changing it to tubular form, means for gradually turning the edges of the web about the horn to cause them to meet in abutting relation to form a continuous tube uniform in wall thickness throughout its length and circumference, roller means engageable with the web along a median line and effective to feed the web and the gradually and progressively formed tube along the horn, and means for applying heat and pressure to set the adhesive and fix the shape of the tube.

JOHN HAYCOCK.